United States Patent
Tsutsumi

(10) Patent No.: US 11,373,292 B2
(45) Date of Patent: Jun. 28, 2022

(54) IMAGE GENERATION DEVICE AND APPEARANCE INSPECTION DEVICE

(71) Applicant: TDK CORPORATION, Tokyo (JP)

(72) Inventor: Takeshi Tsutsumi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 181 days.

(21) Appl. No.: 16/720,474

(22) Filed: Dec. 19, 2019

(65) Prior Publication Data

US 2020/0211169 A1 Jul. 2, 2020

(30) Foreign Application Priority Data

Dec. 28, 2018 (JP) .............................. JP2018-247016

(51) Int. Cl.
*G06T 7/00* (2017.01)
*G01N 21/88* (2006.01)
*G01N 21/95* (2006.01)
*G06K 9/62* (2022.01)

(52) U.S. Cl.
CPC ......... *G06T 7/001* (2013.01); *G01N 21/8851* (2013.01); *G01N 21/9501* (2013.01); *G06K 9/6256* (2013.01); *G06T 2207/20081* (2013.01); *G06T 2207/30148* (2013.01)

(58) Field of Classification Search
CPC ........... G06T 7/001; G06T 2207/20081; G06T 2207/30148; G06T 2207/10004; G06T 2207/30108; G06T 11/00; G06T 7/0004; G01N 21/8851; G01N 21/9501; G06K 9/6256
USPC ........................................................ 382/149
See application file for complete search history.

(56) References Cited

U.S. PATENT DOCUMENTS

| 2004/0218806 A1* | 11/2004 | Miyamoto ............ G06T 7/0004 |
| | | 382/145 |
| 2010/0310150 A1* | 12/2010 | Hayashi ................. G06K 9/469 |
| | | 382/145 |
| 2018/0365822 A1 | 12/2018 | Nipe et al. |
| 2019/0152634 A1* | 5/2019 | Almogy .................. B65B 57/12 |

FOREIGN PATENT DOCUMENTS

| JP | 2005-156334 A | 6/2005 |
| JP | 2011-214903 A | 10/2011 |
| JP | 2018-205123 A | 12/2018 |

OTHER PUBLICATIONS

May 19, 2020 Search Report issued in European Patent Application No. 19217551.1.

(Continued)

*Primary Examiner* — Jerome Grant, II
(74) *Attorney, Agent, or Firm* — Oliff PLC

(57) ABSTRACT

An image generation device and an appearance inspection device which can increase the number of types of training image are provided. An image generation device includes an image acquisition unit configured to acquire a first image; and an image generator configured to generate a training image based on the first image, wherein the first image depicts a first defect included in a first product of a different type the product to be inspected, and the training image is a image to be read by an identifier that identifies whether an inspection image obtained by imaging the product to be inspected depicts a same type of defect as the first defect and to be used by the identifier to perform learning.

17 Claims, 5 Drawing Sheets

(56) References Cited

OTHER PUBLICATIONS

Abdullah et al; "Color Vision System for Ripeness Inspection of Oil Palm Elaeis Guineensis"; Journal of Food Processing Preservation; 2002; vol. 26; pp. 213-235.

Dundar et al; "Context Augmentation for Convolutional Neural Networks"; arxiv. org, Cornell University Library; 2017; vol. 2; pp. 1-8.

* cited by examiner

IMAGE GENERATION DEVICE AND APPEARANCE INSPECTION DEVICE

CROSS-REFERENCE TO RELATED APPLICATION

Priority is claimed on Japanese Patent Application No. 2018-247016, filed Dec. 28, 2018, the content of which is incorporated herein by reference.

BACKGROUND OF THE INVENTION

Field of the Invention

The present invention relates to an image generation device and an appearance inspection device.

Description of Related Art

At present, as artificial intelligence (AI) is being rapidly developed, the importance of machine learning including deep learning has increased, and it is expected to be applied to many fields such as in manufacturing and service industries.

For example, when machine learning is applied in the manufacturing industry, a training image obtained by imaging a non-defective product and a training image obtained by imaging a defective product are required, in order to perform learning of an identifier that identifies whether a product is a non-defective product not containing a defect or a defective product containing a defect. In addition, to improve accuracy in identification by an identifier, it is necessary to prepare a certain number or more of both training images obtained by imaging non-defective products and training images obtained by imaging defective products, to prepare a same number of both training images obtained by imaging non-defective products and training images obtained by imaging defective products.

However, the number of defective products is usually much smaller than the number of non-defective products. For this reason, there are often insufficient training images obtained by imaging defective products as compared to training images obtained by imaging non-defective products. As a technology for solving this problem, for example, Patent Document 1 discloses a pseudo-defective image automatic creation device. The pseudo-defective image automatic creation device extracts a difference data from non-defective products. The pseudo-defective image automatic creation device creates some defect creation conditions such as a defective combination position based on random values. The pseudo-defective image automatic creation device creates some pseudo-defective images by combining the difference data with the non-defective images based on these defect creation conditions. And the pseudo-defective image automatic creation device inputs the pseudo-defective images to a neural network as training images obtained by imaging defective products.

PATENT DOCUMENTS

[Patent Document 1] Japanese Unexamined Patent Application, Second Publication No. 2005-156334

However, since the pseudo-defective image automatic creation device creates a plurality of pseudo-defective images from a small number of training images obtained by imaging defective products in a pseudo manner, the types of pseudo-defective image may be few, and the accuracy in identification by an identifier may not be sufficiently increased.

SUMMARY OF THE INVENTION

Therefore, an object of the present invention is to provide an image generation device and an appearance inspection device that can increase the number of types of training image.

According to one aspect of the present invention, an image generation device includes an image acquisition unit configured to acquire a first image; and an image generator configured to generate a training image based on the first image, wherein the first image depicts a first defect included in a first product of a different type the product to be inspected, and the training image is a image to be read by an identifier that identifies whether an inspection image obtained by imaging the product to be inspected depicts the same type of defect as the first defect and to be used by the identifier to perform learning.

According to the present invention, it is possible to increase the number of types of training image.

DETAILED DESCRIPTION OF THE INVENTION

Embodiment

Figure 1:
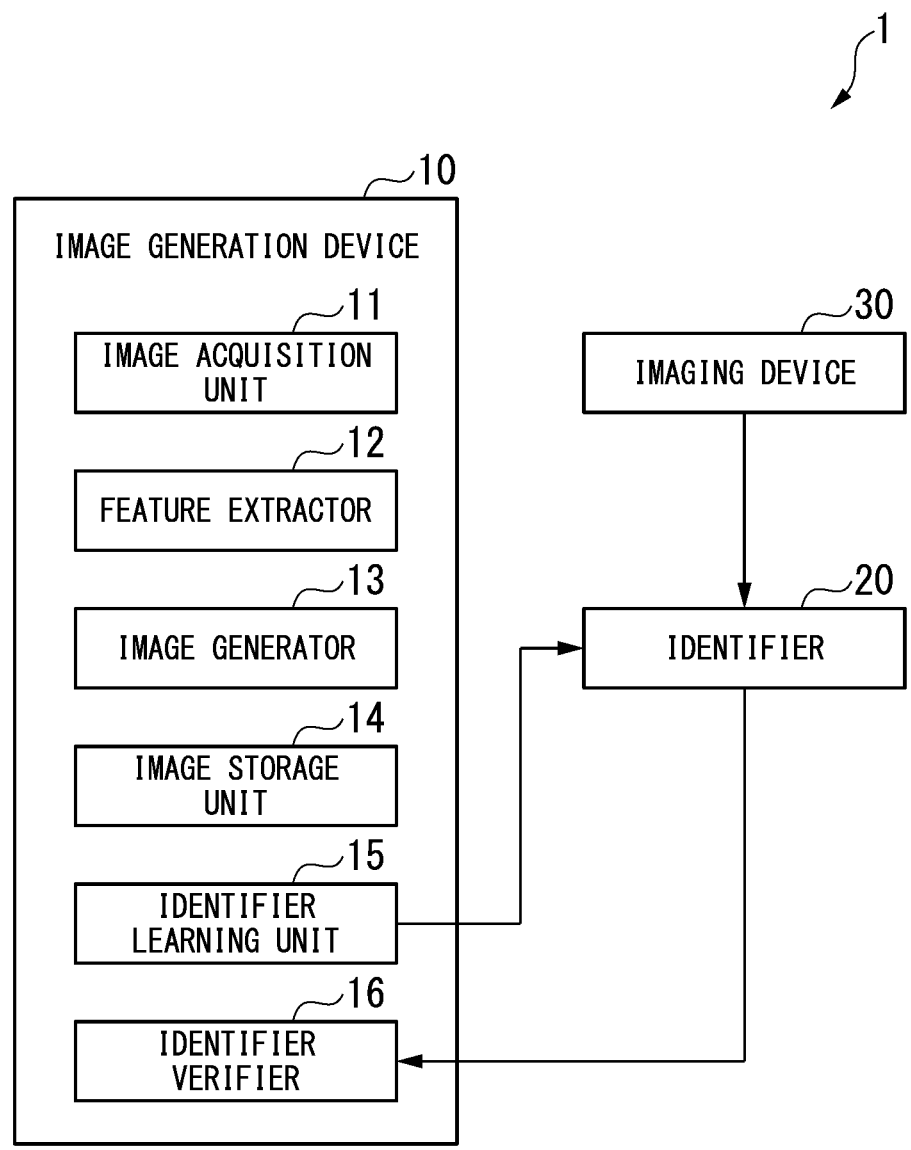
FIG. 1 is a diagram which shows an example of a configuration of an appearance inspection device according to an embodiment.

An example of a configuration of an appearance inspection device according to an embodiment will be described, focusing on an image generation device with reference to FIGS. 1 to 6. FIG. 1 is a diagram which shows the example of the configuration of the appearance inspection device according to the embodiment. As shown in FIG. 1, an appearance inspection device 1 includes an image generation device 10, an identifier 20, and an imaging device 30.

The image generation device 10 includes an image acquisition unit 11, a feature extractor 12, an image generator 13, an image storage unit 14, an identifier learning unit 15, and an identifier verifier 16.

Figure 2:
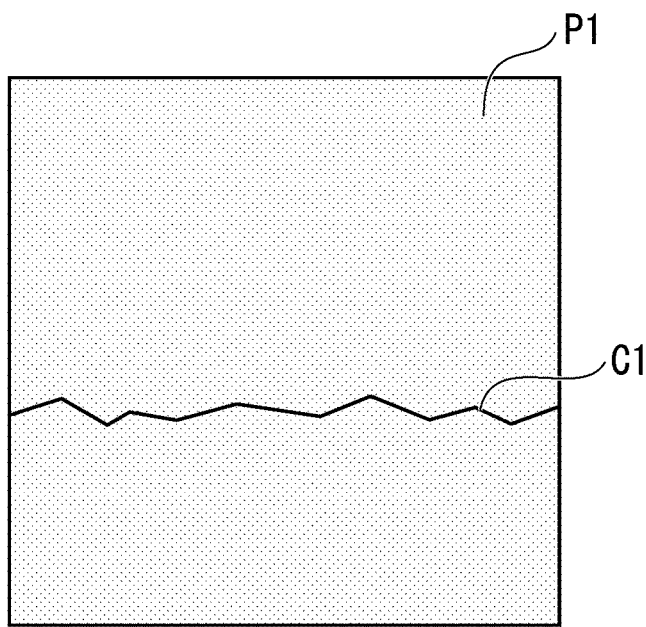
FIG. 2 is a diagram which shows an example of a first image according to the embodiment.

FIG. 2 is a diagram which shows an example of a first image according to the embodiment. The image acquisition unit 11 acquires a first image P1 depicting a first defect included in a first product. The first product is a different type of product from a product to be inspected. In addition, the first defect is a defect such as a crack, a chip, a hole, a dent, or adhesion of foreign matter. As shown in FIG. 2, the first image P1 depicts a first product including a substantially straight crack C1. The image acquisition unit 11 acquires, for example, a first image P1 from a storage medium provided inside or outside of the appearance inspection device 1.

Figure 3:
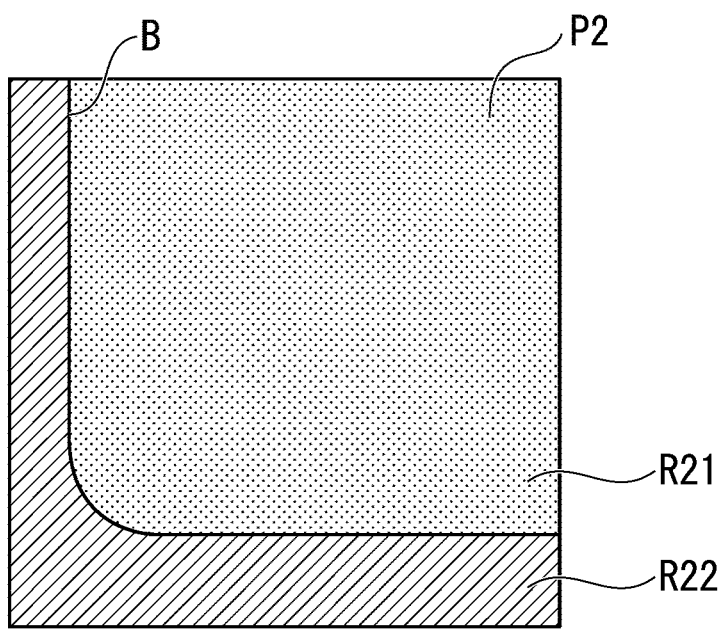
FIG. 3 is a diagram which shows an example of a second image according to the embodiment.

FIG. 3 is a diagram which shows an example of a second image according to the embodiment. The feature extractor 12 images the second product, which is the same as a type of a product to be inspected, and extracts feature data indicating features of the second image P2 not depicting a defect from the second image P2. In addition, the first product and the second product are different types of product. For example, the first product is a resin product and the second product is a ceramic product.

In addition, the feature data includes values related to a hue of each pixel in a region in which the second product of the second image P2 is depicted, and values indicating a degree of variability in the hue. The region is, for example, a region R21 shown in FIG. 3. The values related to a hue are, for example, an average, a median, a maximum value, and a minimum value of the hue, and values obtained by performing appropriate correction and weighting on these values. The values indicating a degree of variability in hue are, for example, a dispersion and a standard deviation of the hue.

Alternatively, the feature data may include boundary data indicating a boundary B between a second product and a background depicted by the second image P2. As shown in FIG. 3, the boundary B is a line that separates the region R21 from a region R22. For example, the feature extractor 12 may extract boundary data indicating the boundary B by applying edge detection to the second image P2. However, the feature extractor 12 may extract the boundary data with a method other than edge detection.

Alternatively, the feature data may include background data indicating a background of the second product depicted by the second image P2. The background is depicted in the region R22 of the second image P2. For example, the feature extractor 12 extracts the background data indicating the background by applying image recognition to the second image P2. Specifically, when the feature extractor 12 extracts the background data from the second image P2, the feature extractor 12 recognizes the region R21 and the region R22 using the boundary data indicating the boundary B, recognizes the background as being depicted in the region R22 by applying image recognition to each of the region R21 and the region R22, and extracts the background data from the region R22. However, the feature extractor 12 may recognize the region R21 and the region R22 with other methods or may recognize that the background is depicted in the region R22 with other methods.

Figure 4:
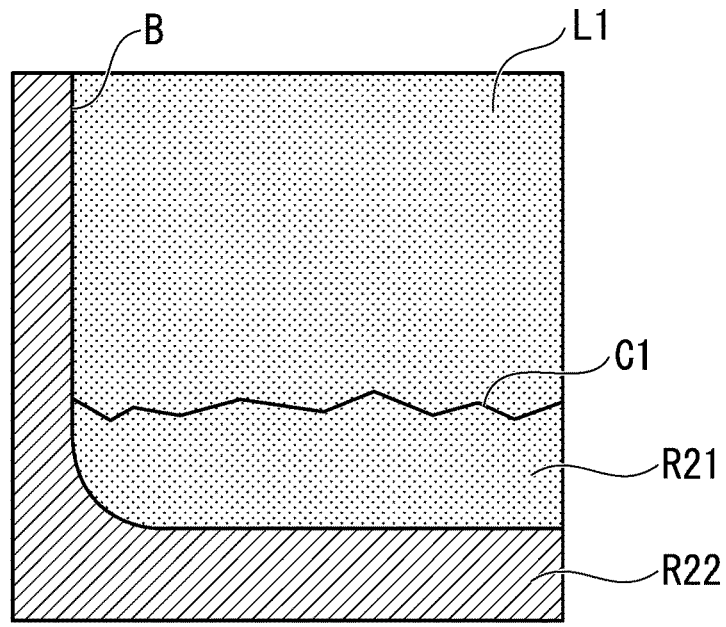
FIG. 4 is a diagram which shows an example of a training image generated by an image generation device according to the embodiment.

FIG. 4 is a diagram which shows an example of a training image generated by an image generation device according to the embodiment. The image generator 13 generates a training image L1 shown in FIG. 4, based on the first image P1 and the feature data.

First, the image generator 13 deletes a hue from each pixel of the entire first image P1. Next, the image generator 13 replaces the hue of each pixel of the entire first image P1 with a value related to a hue of each pixel in the region R21 of the second image P2 included in the feature data described above. In this case, the value related to the hue is, for example, an average of the hue. Furthermore, the image generator 13 adds noise defined by a value indicating a degree of variability in the hue of each pixel in the region R21 of the second image P2 included in the feature data described above to the hue of each pixel of the entire first image P1. In this case, for example, the value indicating the degree of variability is a dispersion, and the noise is Gaussian noise defined by a mean and a dispersion of the hue of each pixel in the region R21 of the second image P2. According to these two types of processing, the hue of each pixel of the entire first image P1 becomes close to the hue of the region R21 in which the second product in the second image P2 is depicted. Note that the entire first image P1 referred to herein is an example of a region in which the first product in the first image P1 is depicted. In addition, the region in which the first product in the first image P1 is depicted may be a region in which the first defect included in the first product is depicted and a region in the vicinity thereof.

Then, the image generator 13 combines the boundary B with the first image P1 based on the boundary data included in the feature data described above, and combines the background depicted in the region R22 of the second image P2 with the first image P1 based on the background data included in the feature data described above. As described above, the image generator 13 generates the training image L1 shown in FIG. 4.

Figure 5:
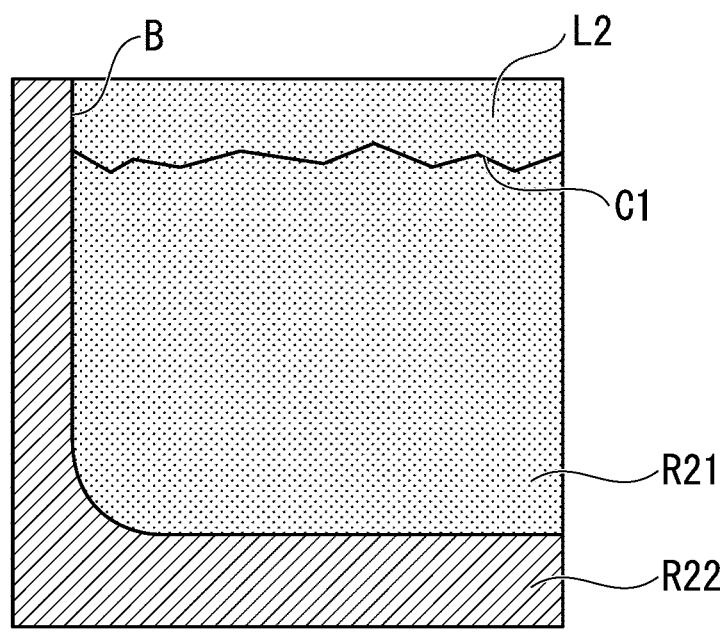
FIG. 5 is a diagram which shows an example of a training image generated by the image generation device according to the embodiment.
Figure 6:
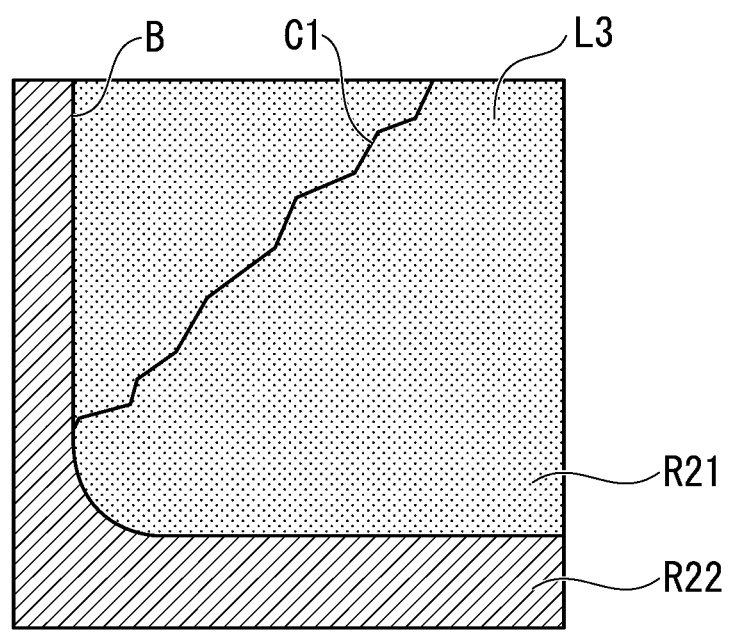
FIG. 6 is a diagram which shows an example of a training image generated by the image generation device according to the embodiment.

Moreover, the image generator 13 may generate a training image L2 shown in FIG. 5 or a training image L3 shown in FIG. 6 by changing at least one of a position and a direction of the crack C1 that is an example of a first defect depicted by the first image P1 shown in FIG. 2. FIGS. 5 and 6 are diagrams which show examples of training images generated by the image generation device according to the embodiment.

For example, the image generator 13 may execute hue replacement, noise addition, boundary combination, and background combination described above and generate the training image L2 shown in FIG. 5 after causing the position of the crack C1 to be translated using image processing to the first image P1 shown in FIG. 2.

Alternatively, the image generator 13 may cause the direction of the crack C1 to be rotated by 45 degrees counterclockwise by applying image processing to the first image P1 shown in FIG. 2, and then execute the hue replacement, the noise addition, the boundary combination, and the background combination described above, and generate the training image L3 shown in FIG. 6.

The image storage unit 14 is a storage medium which stores the training image L1, the training image L2, and the training image L3 generated by the image generator 13.

The identifier learning unit 15 causes the identifier 20 shown in FIG. 1, to perform learning by causing it to be read a training image.

The identifier 20 identifies whether an inspection image obtained by imaging a product to be inspected depicts the same type of defect as the first defect depicted by the first image P1 using machine learning. The machine learning referred to herein includes deep learning and is, for example, a neural network, a support vector machine (SVM), or a random forest. In addition, the inspection image is, for example, imaged by the imaging device 30 shown in FIG. 1.

The identifier learning unit 15 causes a training image for each type of a specific defect to be read with respect to each type of defect such as a crack, a chip, a hole, a dent, and adhesion of foreign matter. For example, the identifier learning unit 15 may cause the identifier 20 to read a certain number of training images for each of crack features, such as a crack that is in a substantially straight line, a crack that branches in the middle, or a crack that is bent, with respect to a crack which is one type of defect.

The identifier verifier 16 causes the identifier 20 to read an abnormal inspection image obtained by imaging a product to be inspected, which includes the same type of defect as the first defect depicted by the first image P1, and verifies an accuracy in identification by the identifier 20. For example, the identifier verifier 16 depicts a crack that is in a substantially straight line such as the training image L1 shown in FIG. 4, and causes the identifier 20 to read a certain number of training images or more generated from the first image P1 and the like shown in FIG. 2. Then, the identifier verifier 16 inputs the inspection image of a product to be inspected, which includes a crack that is in a substantially straight line to the identifier 20, and verifies whether the identifier 20 identifies that a crack in a substantially straight line is depicted in the inspection image.

Figure 7:
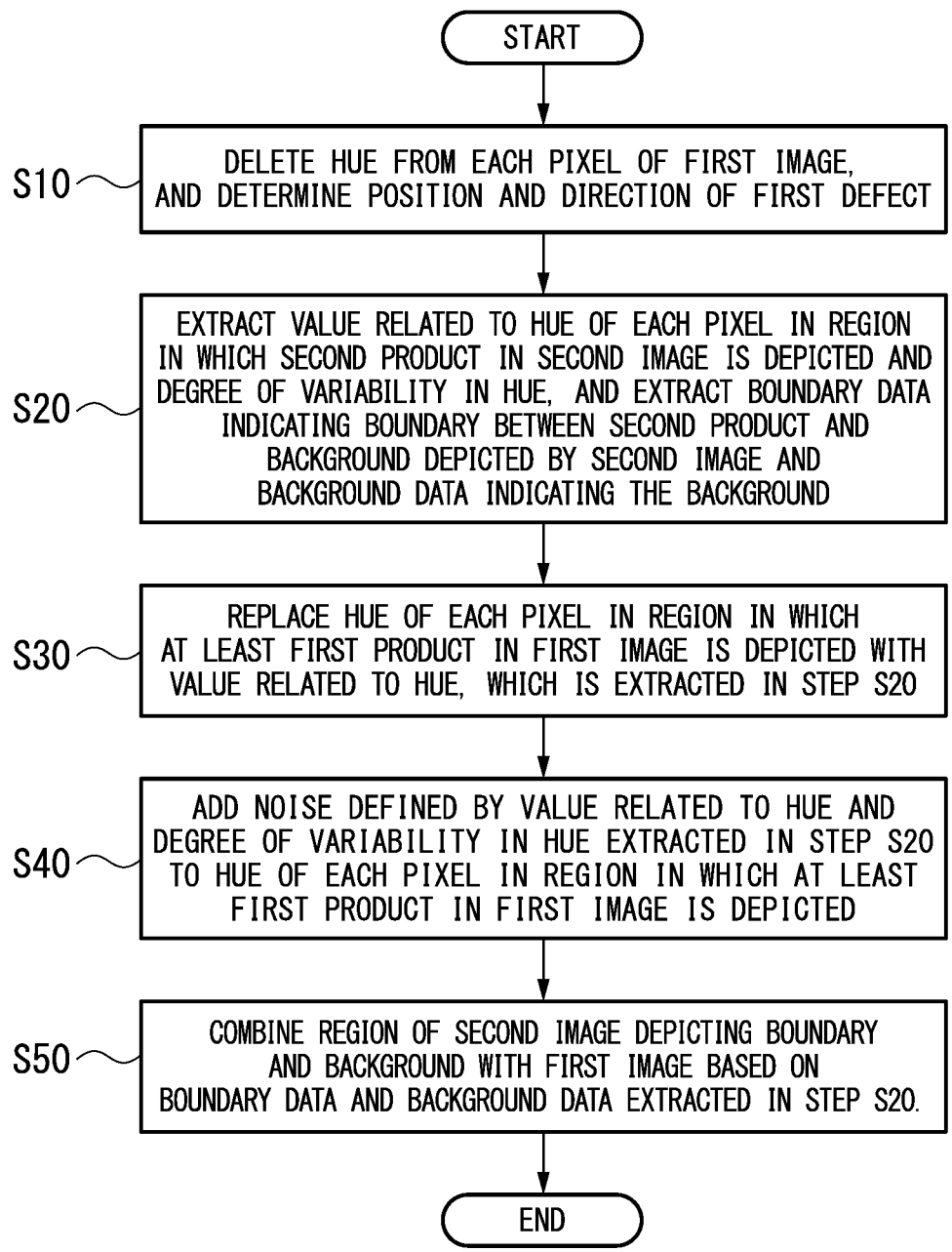
FIG. 7 is a flowchart which shows an example of processing executed by the image generation device according to the embodiment.

Next, an example of operations of the image generation device according to the embodiment will be described with reference to FIG. 7. FIG. 7 is a flowchart which shows an example of processing executed by the image generation device according to the embodiment.

In step S10, the image generator 13 deletes a hue from each pixel of the first image P1, and determines a position and a direction of a first defect.

In step S20, the feature extractor 12 extracts the value related to the hue of each pixel in a region in which the second product in the second image P2 is depicted and the degree of variability in hue, and extracts boundary data indicating a boundary B between the second product and a background depicted by the second image P2 and background data indicating the background.

In step S30, the image generator 13 replaces a hue of each pixel in the region in which at least a first product in the first image P1 is depicted with the value related to the hue, which is extracted in step S20.

In step S40, the image generator 13 adds noise defined by the value related to the hue and the degree of variability in hue extracted in step S20 to a hue of each pixel in the region in which at least the first product of the first image P1 is depicted.

In step S50, the image generator 13 combines the region R22 of the second image P2 depicting the boundary B and the background with the first image P1 based on the boundary data and the background data extracted in step S20.

As described above, the image generation device 10 according to the embodiment has been described. The image generation device 10 generates at least one of a training image L1, a training image L2, and a training image L3 based on the first image P1 depicting the first defect included in the first product. As a result, the image generation device 10 can increase the number of types of training image and contribute to improving the accuracy in identification by the identifier 20.

In addition, the image generation device 10 extracts feature data indicating the features of the second image P2, and generates at least one of the training image L1, the training image L2, and the training image L3 based on the first image P1 and the feature data. As a result, the image generation device 10 can bring features of the training image L1, the training image L2, and the training image L3 close to features of an inspection image of a product to be inspected and contribute to improving the accuracy in identification by the identifier 20, even though features of the first image P1 are different from features of the second image.

In addition, the image generation device 10 extracts the value related to the hue of each pixel in the region R21 in which the second product in the second image P2 is depicted and the value indicating the degree of variability in the hue. Then, the image generation device 10 replaces the hue of each pixel in the region in which at least the first product of the first image P1 is depicted with the value related to the hue of each pixel in the region R21, and adds noise defined by the value indicating the degree of the variability in hue of each pixel in the region R21 to the hue of each pixel in the region in which at least the first product in the first image P1 is depicted. As a result, the image generation device 10 can bring the hues of the training image L1, the training image L2, and the training image L3 close to the hue of the inspection image of a product to be inspected and contribute to improving the accuracy in identification by the identifier 20, even though a hue of the first image P1 is different from a hue of the second image.

Moreover, the image generation device 10 extracts boundary data indicating the boundary B between the second product and the background depicted by the second image P2, and combines the boundary B with the first image P1 based on the boundary data. Furthermore, the image generation device 10 extracts background data indicating the background of the second product depicted by the second image P2, and combines the background with the first image P1 based on the background data. According to these two types of processing, the image generation device 10 can bring the features of these training images close to the features of the inspection image of a product to be inspected by including the boundary B and the background in the training image L1, the training image L2, and the training image L3, and contribute to improving the accuracy in identification by the identifier 20. In particular, when the boundary and the background are easily recognized as the features by the identifier 20, these two types of processing are useful because the features of these training images become further closer to the feature of the image to be inspected.

In addition, the image generation device 10 generates a training image L2 and a training image L3 by changing at least one of the position and the direction of the first defect depicted by the first image P1. As a result, since the image generation device 10 can generate two training images L2 and L3 in addition to the training image L1 from one first image P1, it is possible to contribute to improving the accuracy in identification by the identifier 20 by further increasing the types of training images.

The first product and the second product are different types of product. For this reason, the image generation device 10 can generate at least one of the training image L1, the training image L2, and the training image L3 from the first image P1 obtained by imaging the first defect included in the first product even though the number of images depicting a defect included in the second product is small. Therefore, it is possible to increase the number of types of training image and to contribute to improvement of the identification accuracy of the identifier 20.

In addition, the image generation device 10 causes the identifier 20 to read the training image L1, the training image L2, and the training image L3 and causes the identifier 20 to perform learning. Then, the image generation device 10 causes the identifier 20 to read an abnormal inspection image obtained by imaging a product to be inspected, which includes the same type of defect as the first defect depicted by the first image P1, and verifies the accuracy in the identification by the identifier 20. Therefore, the image generation device 10 can not only verify how much the accuracy in identification by the identifier 20 is improved but also guide learning by the identifier 20 using the training image L1, the training image L2, and the training image L3 in a better direction.

Note that the image generator 13 may generate a training image based on the first image P1 without using feature data indicating the features of the second image P2. In this case, the image generator 13 generates a training image by deleting data indicating the hue of each pixel in a region in which at least the first defect included in the first product in the first image P1 is depicted.

Note that the image acquisition unit 11 may acquire a third image depicting the second defect that is the same type of defect as the first defect and is included in the second product, separately from the first image. In this case, the image generator 13 generates a training image on the basis of the third image separately from the training images generated on the basis of the first image P1. Alternatively, the image generator 13 generates a training image by changing at least one of the position and direction of the second defect depicted by the third image according to processing in which the position of the second defect is caused to be parallel translated by applying image processing to the third image or processing in which the direction of the second defect is rotated. Therefore, the image generation device 10 can further increase the types of training images and contribute to improving the accuracy in identification by the identifier 20.

Note that the abnormal inspection image described above may include not only an inspection image acquired separately from the training images but also at least one of the first image and the third image.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

1 Appearance inspection device
10 Image generation device
11 Image acquisition unit
12 Feature extractor
13 Image generator
14 Image storage unit
15 Identifier learning unit
16 Identifier verifier
20 Identifier
30 Imaging device
B Boundary
C1 Crack
L1, L2, L3 Training image
P1 First image
P2 Second image
R21, R22 Region

What is claimed is:

1. An image generation device comprising:
  an image acquisition unit configured to acquire a first image; and
  an image generator configured to delete a hue from each pixel of the entire first image, and to generate a training image based on the first image after deleting the hue,
  wherein the first image depicts a first defect included in a first product of a different type from the product to be inspected, and
  the training image is an image to be read by an identifier that identifies whether an inspection image obtained by imaging the product to be inspected depicts a same type of defect as the first defect and to be used by the identifier to perform learning.

2. The image generation device according to claim 1, wherein the image generator generates the training images by changing at least one of a position and a direction of the first defect depicted by the first image.

3. The image generation device according to claim 1, further comprising:
  an identifier learning unit configured to cause the identifier to read the training images and to perform learning; and
  an identifier verifier configured to cause the identifier to read an abnormal inspection image obtained by imaging the product to be inspected, which includes the same type of defect as the first defect, and to verify an accuracy in identification by the identifier.

4. An appearance inspection device comprising:
  an imaging device configured to image a product to be inspected; and
  an identifier which has performed learning by reading the training image generated by the image generation device according to claim 1.

5. The image generation device according to claim 1, further comprising:
  a feature extractor configured to image a second product, and extract feature data from the second image,
  wherein the second product is a same type of a product as the product to be inspected,
  the feature data indicates a feature of the second image not depicting a defect, and
  the image generator generates the training image based on the feature data in addition to the first image.

6. The image generation device according to claim 5, further comprising:
  an identifier learning unit configured to cause the identifier to read the training images and to perform learning; and
  an identifier verifier configured to cause the identifier to read an abnormal inspection image obtained by imaging the product to be inspected, which includes the same type of defect as the first defect, and to verify an accuracy in identification by the identifier.

7. The image generation device according to claim 5, wherein the feature extractor extracts a background data as the feature data,
  the background data indicates a background of the second product depicted by the second image, and
  the image generator combines the background with the first image on the basis of the background data.

8. The image generation device according to claim 7, wherein the feature extractor extracts a boundary data as the feature data,
  the boundary data indicates a boundary between the second product and the background depicted by the second image, and
  the image generator combines the boundary with the first image based on the boundary data.

9. The image generation device according to claim 5,
wherein the image acquisition unit further acquires a third image depicting a second defect included in the second product,
the second defect is the same type of defect as the first defect, and
the image generator further generates the training images based on the third image.

10. The image generation device according to claim 9,
wherein the image generator generates the training images by changing at least one of a position and a direction of the second defect depicted by the third image.

11. An appearance inspection device comprising:
an imaging device configured to image a product to be inspected; and
an identifier which has performed learning by reading the training image generated by the image generation device according to claim 5.

12. The image generation device according to claim 5,
wherein the feature extractor extracts a value as the feature data,
the value relates to a hue of each pixel in a region in which the second product of the second image is depicted, and
the image generator replaces a hue of each pixel in a region in which the first product in the first image is depicted with the value.

13. The image generation device according to claim 12,
wherein the feature extractor extracts a value as the feature data,
the value indicates a degree of variability in hue of each pixel in a region in which the second product in the second image is depicted, and
the image generator adds noise defined by the value to a hue of each pixel in a region in which the first product in the first image is depicted.

14. The image generation device according to claim 13,
wherein the feature extractor extracts a background data as the feature data,
the background data indicates a background of the second product depicted by the second image, and
the image generator combines the background with the first image on the basis of the background data.

15. The image generation device according to claim 14,
wherein the feature extractor extracts a boundary data as the feature data,
the boundary data indicates a boundary between the second product and the background depicted by the second image, and
the image generator combines the boundary with the first image based on the boundary data.

16. The image generation device according to claim 12,
wherein the feature extractor extracts a background data as the feature data,
the background data indicates a background of the second product depicted by the second image, and
the image generator combines the background with the first image on the basis of the background data.

17. The image generation device according to claim 16,
wherein the feature extractor extracts a boundary data as the feature data,
the boundary data indicates a boundary between the second product and the background depicted by the second image, and
the image generator combines the boundary with the first image based on the boundary data.

* * * * *